US007226359B2

(12) United States Patent
Bussick et al.

(10) Patent No.: US 7,226,359 B2
(45) **Date of Patent: *Jun. 5, 2007**

(54) GAMING DEVICE HAVING DUAL EVALUATION SCHEME

(75) Inventors: William J. Bussick, Reno, NV (US); Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/277,608

(22) Filed: Mar. 27, 2006

(65) Prior Publication Data

US 2006/0172795 A1 Aug. 3, 2006

Related U.S. Application Data

(63) Continuation of application No. 09/687,689, filed on Oct. 13, 2000, now Pat. No. 7,070,502.

(51) Int. Cl.
*A63F 13/00* (2006.01)

(52) U.S. Cl. ........................................................ 463/20

(58) Field of Classification Search .............. 463/9–13, 463/16–20; 273/138.1, 139, 143 R, 292
See application file for complete search history.

(56) References Cited

U.S. PATENT DOCUMENTS 4,743,022 A 5/1988 Wood
5,332,228 A 7/1994 Schultz
5,423,539 A 6/1995 Nagao
5,431,408 A 7/1995 Adams
5,449,173 A 9/1995 Thomas et al.
5,762,552 A 6/1998 Vuong et al.
5,823,873 A 10/1998 Moody
5,873,781 A 2/1999 Keane
6,089,977 A 7/2000 Bennett
6,120,031 A 9/2000 Adams
6,120,378 A 9/2000 Moody
6,159,095 A 12/2000 Frohm et al.

(Continued)

FOREIGN PATENT DOCUMENTS

AU 722 969 B 8/2000

(Continued)

OTHER PUBLICATIONS

Enchanted Forest Brochures, written by Aristocrat, 1995.

(Continued)

*Primary Examiner*—Scott Jones
(74) *Attorney, Agent, or Firm*—Bell, Boyd & Lloyd LLP

(57) ABSTRACT

A method for evaluating a player's award in a game wherein one symbol of the gaming device changes into another. In one embodiment, all awards for predetermined symbols and combinations thereof, including winning combinations produced by a wild symbol are provided to the player. In a second step, the game awards all awards for predetermined symbols and combinations thereof produced after the wild symbol has changed one or more non-wild symbols to a wild symbol. This step includes awarding the player for combinations previously awarded in the first step, which may or may not have been the result of the wild symbol.

40 Claims, 9 Drawing Sheets

U.S. PATENT DOCUMENTS

| | | | |
|---|---|---|---|
| 6,165,070 | A | 12/2000 | Nolte et al. |
| 6,190,254 | B1 | 2/2001 | Bennett |
| 6,290,600 | B1 | 9/2001 | Glasson |
| 6,299,165 | B1 | 10/2001 | Nagano |
| 6,439,993 | B1 | 8/2002 | O'Halloran |
| 6,517,432 | B1 | 2/2003 | Jaffe |
| 6,551,187 | B1 | 4/2003 | Jaffe |
| 6,604,740 | B1 | 8/2003 | Singer et al. |
| 6,616,142 | B2 | 9/2003 | Adams |
| 2002/0193160 | A1 | 12/2002 | Tarantino |

FOREIGN PATENT DOCUMENTS

| | | |
|---|---|---|
| EP | 0 060 019 | 9/1982 |
| EP | 0 984 408 | 3/2000 |
| GB | 2 101 380 | 1/1983 |
| WO | WO 97/32285 | 9/1997 |
| WO | WO 00/66235 | 11/2000 |
| WO | WO 0076606 | 12/2000 |

OTHER PUBLICATIONS

Break the Spell Brochure, written by Atronic, 1999.

Break the Spell Article, written by Strictly Slots, 2000.

Merriam-Webster's Collegiate Dictionary, 1999, Merriam Webster, Incorporated, Tenth Edition, p. 131.

Munsters Article, written by Strictly Slots, available before Oct. 2000.

Haywire Game Feature Description, written by IGT, available before Oct. 2000.

GAMING DEVICE HAVING DUAL EVALUATION SCHEME

PRIORITY CLAIM

This application is a continuation of, claims priority to and the benefit of U.S. patent application Ser. No. 09/687,689, filed Oct. 13, 2000, now U.S. Pat. No. 7,070,502 the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a wildcard symbol that affects other symbols in a same row, column or set as said wild card symbol, and wherein the game exercises two evaluations in determining the player's award.

BACKGROUND OF THE INVENTION

It is well known in the gaming industry to replace one symbol for another. In video poker, for example, the player discards unwanted cards (or symbols) and keeps desired cards (or symbols). Another well known concept related to symbol changing is the wildcard or wild symbol. A conventional wild symbol normally operates to stand for each and every non-wild symbol of the game, so that the wild symbol produces any win that each non-wild symbol or each combination having that non-wild symbol produces, wherein the combination is created in conjunction with other non-wild symbols.

Referring to FIGS. 3A through 3C, three screens of a central display device 30 (described in FIGS. 1A and 1B) illustrate the known operation of a wild symbol. Screen 30 of FIG. 3A illustrates a wild symbol "W", a heart and a cherry on one payline or one row of symbols of a slot machine gaming device. If the only non-wild symbols that the game includes are the heart and the cherry, then screens 30 of FIGS. 3B and 3C illustrate the complete effect of the wild symbol "W". Screen 30 of FIG. 3B figuratively illustrates that the wild symbol stands for or in the place of a heart symbol on the payline or row of symbols. Screen 30 of FIG. 3C figuratively illustrates that the wild symbol stands for or in the place of the cherry symbol on the payline or row of symbols.

It is also known to provide a gaming device that changes one or more non-wild symbols into a wild symbol, whereafter the changed wild symbol stands for each and every non-wild symbol of the game. For example, in a base game of a gaming device having a plurality of reels and displaying a plurality of rows of symbols, known gaming devices can change one or more non-wild symbols on the same reel as a randomly generated wildcard symbol.

Wildcards or wild symbols are well known in base games as well as bonus games of gaming devices. For example, in video poker, a wildcard can stand in the place of any other numbered or face card. A wildcard can turn two sevens into three of a kind. A wildcard can also produce a "straight" in a hand otherwise having four of the set including an ace, king, queen, jack and a ten.

PCT application No. PCT/AU97/00121 entitled, Slot Machine Game with Roaming Wild Card, having a publication date of Sep. 4, 1997, discloses a bonus game example. In this application, a slot machine having a video display contains a plurality of rotatable reels with game symbols. When the player receives a triggering symbol or combination, the game produces a bonus or wild symbol. The bonus or wild symbol moves from game symbol to game symbol temporarily changing the game symbol to a wild symbol. If the change results in a winning combination, the player receives an award.

In known non-bonus gaming systems, i.e., in the base game having a plurality of reels, the games evaluate the effect of a wild symbol one time. Thus, if a wildcard creates a new winning combination on a payline of a known slot machine, wherein the payline already contains a winning combination separate and apart from the new winning combination via the wildcard, the known slot machine will pay the separate winning combination once and the new combination once via the wild symbol. Known games thus spins the reels, pay out the combinations, change non-wild symbols to wild symbols and pay out the combinations which include the changed symbols. They do not perform a total re-evaluation and pay all combinations again.

In general, gaming machines count winning combinations once. That is, when one or more symbols change and potentially create one or more new winning combinations, known games will credit the player for winning combinations prior to the change and then the new winning combinations, but will not repay non-changing combinations on a second evaluation. Gaming device manufacturers constantly strive to develop new games and new and exciting ways to award players.

SUMMARY OF THE INVENTION

The present invention provides a method for evaluating a player's award in a game, wherein one symbol of the gaming device changes into another. Specifically, the present invention provides a new method of evaluating winning combinations of symbols when one or more of the symbols changes and a winning combination exists before the change and a new winning combination exists after the change. The present invention applies to a gaming device having one or more reels, wherein each reel has a plurality of symbols. The present invention also applies to a bonus round of a gaming device, wherein the bonus round displays a plurality of changeable symbols. The present invention further applies to any video card game wherein one card having a symbol or number replaces another of such cards.

The present invention preferably employs a video monitor, wherein the symbols are simulated and changing the symbols includes replacing one simulated symbol with another preferably through an entertaining and exciting method. Alternatively, the present invention can employ a mechanical symbol display having a mechanism to change the symbols or a method to indicate that a symbol has changed.

In one preferred embodiment, the present invention provides a method for evaluating a player's award in a game wherein one wild symbol turns other symbols wild. The method of the present invention involves a two step award evaluation. In one step, the game provides all awards for predetermined symbols and combinations thereof, including winning combinations produced by a wild symbol. If the player receives a winning combination coupled with the wild symbol, the first step pays for both the winning combination and the winning combination coupled with the wild symbol. The wild symbol can function alternatively, such as standing in the place of certain symbols but not in place of each symbol of the gaming device.

In a second step, the game awards all awards for predetermined symbols and combinations thereof produced after the wild symbol has changed one or more non-wild symbols to a wild symbol. This step includes awarding the player for combinations previously awarded in the first step, which may or may not have been the result of the wild symbol. The preferred embodiment applies to symbol generating gaming devices, such as slot machines, as well as video card gaming machines that generate playing cards having number or face card symbols.

In another embodiment, the present invention provides a method for evaluating a player's award in a game wherein one symbol substitutes for or replaces another symbol. The method again involves a two step award evaluation. In one step, the game provides all awards for predetermined symbols and combinations thereof, before the substitution or replacement. In a second step, the game provides all awards for predetermined symbols and combinations thereof produced after the substitution or replacement. This step includes awarding the player for combinations previously awarded in the first step, which remain after the substitution or replacement. This embodiment also applies to slot machines as well as video card games.

It is therefore an object of the present invention to provide a gaming device wherein one symbol substitutes for or replaces another symbol, and wherein the game provides awards for all winning symbols and winning combinations of symbols before said substitution or replacement and for all winning symbols and combinations of winning symbols after said substitution or replacement.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
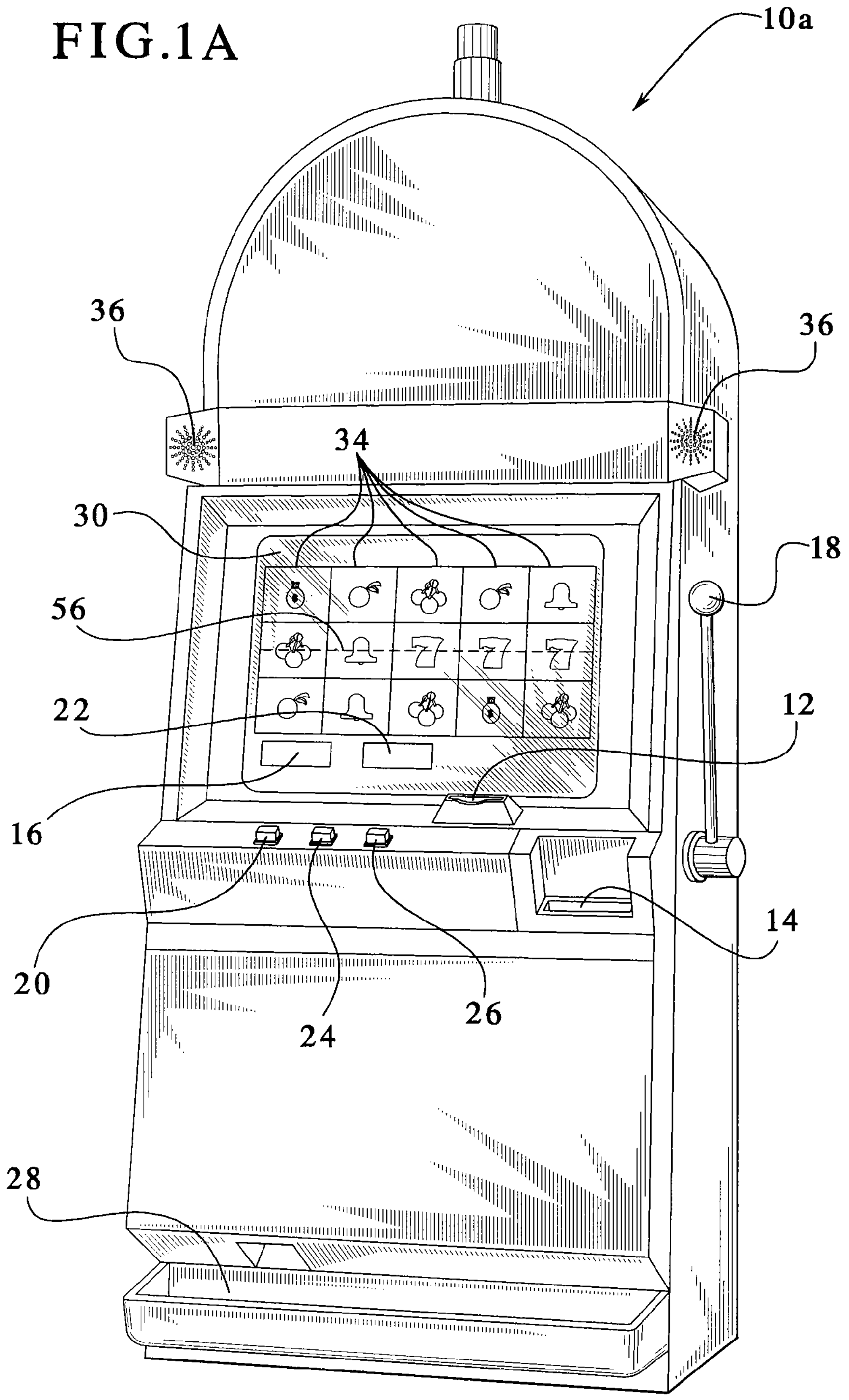
FIG. 1A is a perspective view of one embodiment of the gaming device of the present invention.
Figure 1B:
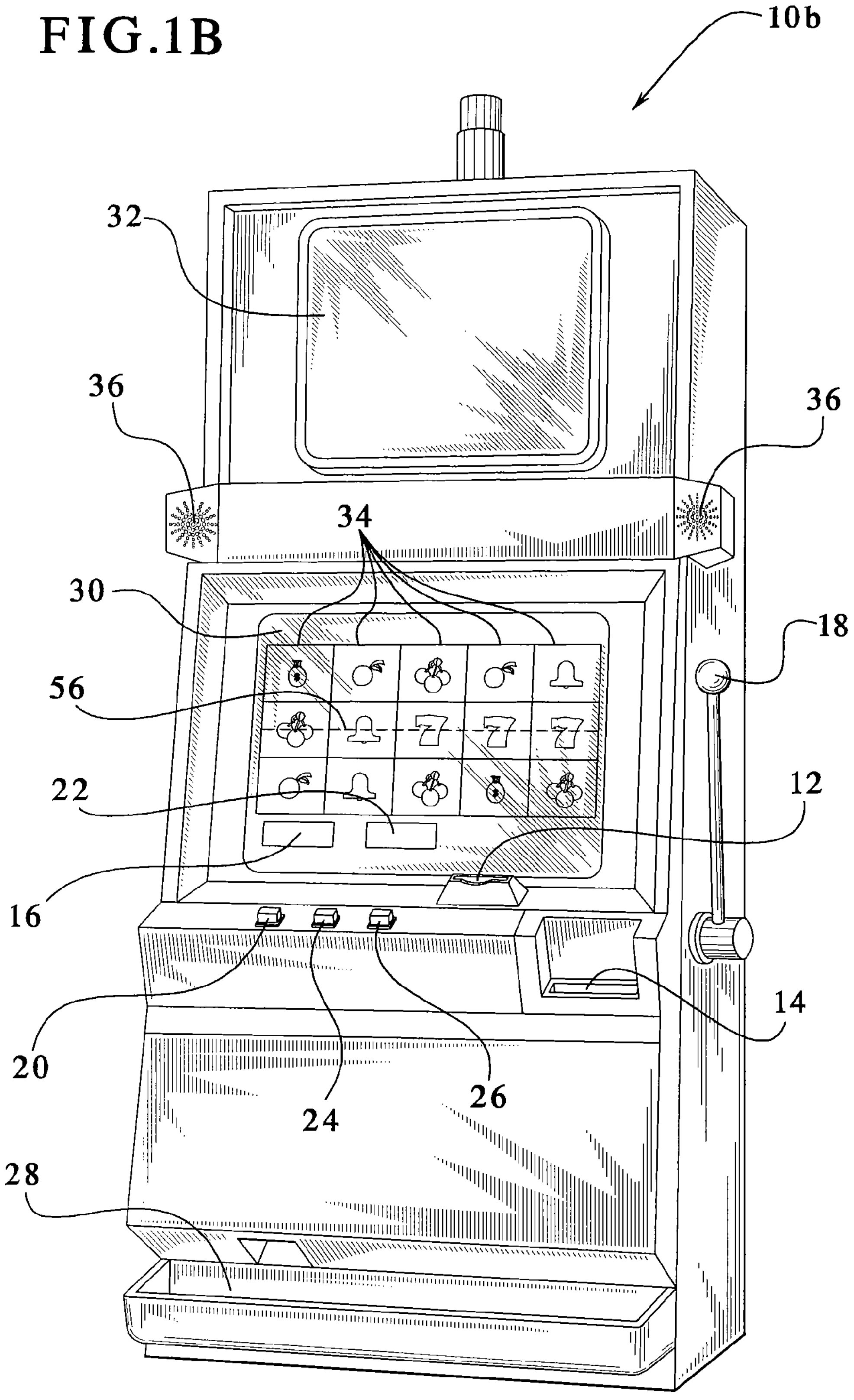
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
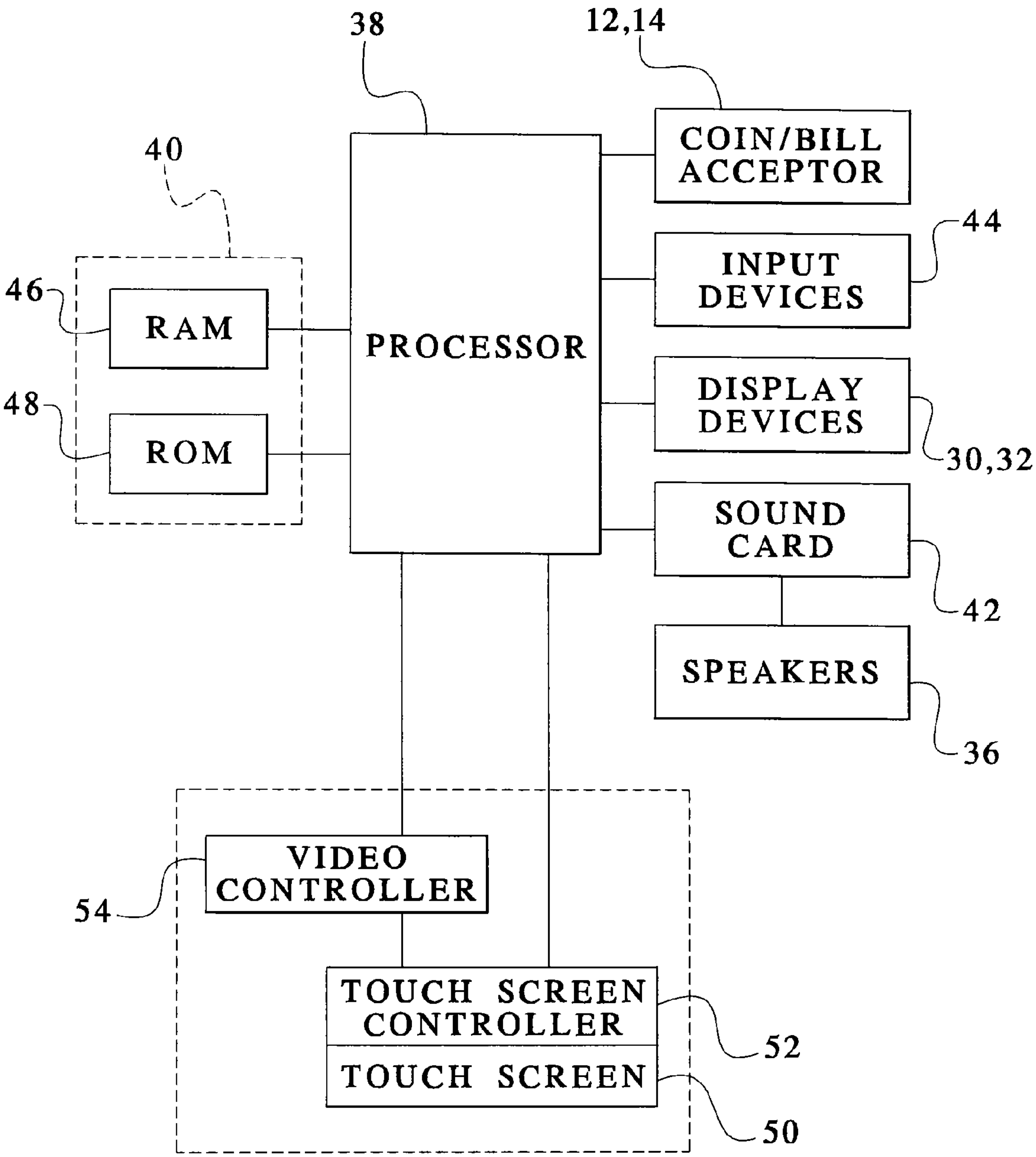
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Preferred Method—Slot Machine Embodiment

Figure 4:
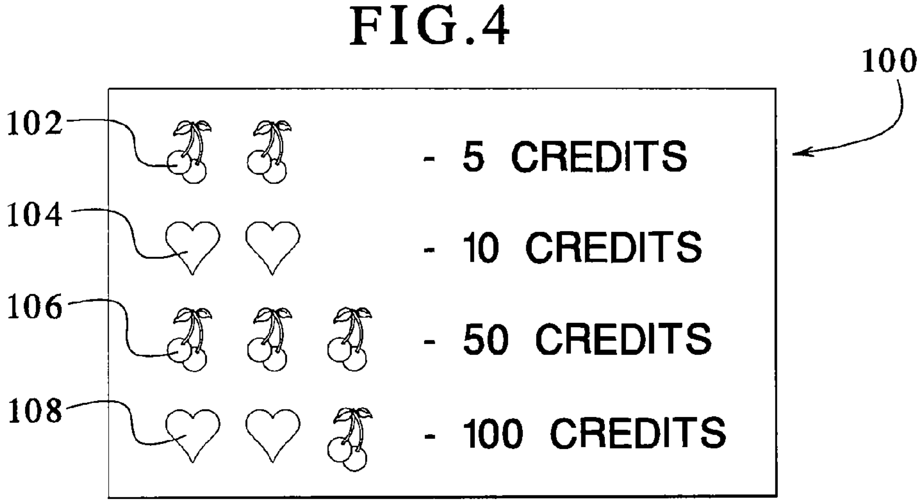
FIG. 4 is a front elevational view of a display device having a sample paytable, which includes a plurality of winning symbol combinations for a slot machine of the present invention.

Referring now to FIG. 4, a well known paytable 100 having a plurality of winning symbol combinations that will aid in the description of the present invention is illustrated. All gaming devices, including slot, poker and other card machines include some form of winning symbol list or paytable that informs the player of symbols or symbol combinations that produce an award for the player. On gaming device 10*b*, for example, the upper display device 32 can contain the paytable. Paytable 100 includes: a winning combination 102 of two cherries that yields five credits to the player; a winning combination 104 of two hearts that yields ten credits to the player; a winning combination 106 of three cherries that yields fifty credits to the player; and a winning combination 108 of two hearts and a cherry that yields one hundred credits to the player.

Figure 5A:
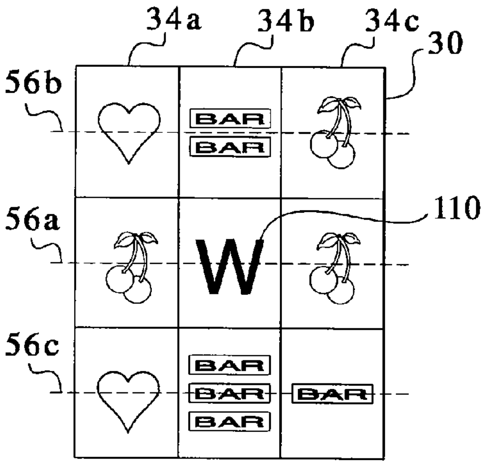
FIGS. 5A and 5B are front elevational views of a display device including the preferred method of the present invention in a slot machine embodiment, wherein a preferably randomly generated wild symbol replaces every other non-wild symbol on a reel associated with the wild symbol.
Figure 5B:
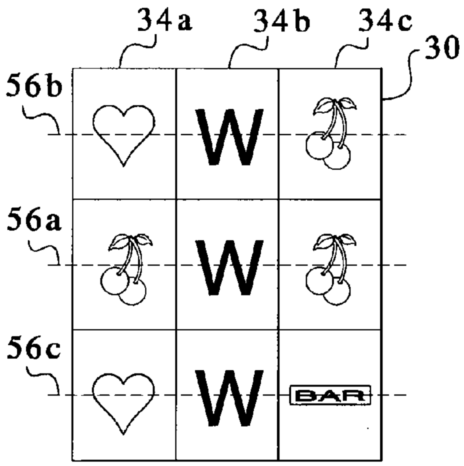

Referring now to FIGS. 5A and 5B, one preferred method of the present invention is disclosed in a slot machine embodiment. FIGS. 5A and 5B both include the central display device 30, three reels 34*a*, 34*b* and 34*c* and three paylines 56*a*, 56*b* and 56*c*. FIGS. 5A and 5B illustrate a plurality of randomly generated symbols, some of which, namely the heart and the cherry, are located on the paytable 100 of FIG. 4. The paytable 100 of FIG. 4 is to be used in conjunction with the description of FIGS. 5A and 5B.

FIG. 5A also includes a preferably randomly generated wild symbol 110 shown as a "W" on reel 34*b* and payline 56*a*. FIG. 5B illustrates that the game of the present example maintains a feature whereby the randomly appearing wild symbol 110 on the central display device 30, as indicated by FIG. 5A, in turn replaces or substitutes for every display symbol on the wild symbol's associated reel, 34*b*, into a wild symbol, as indicated by FIG. 5B. The preferred method of the present invention evaluates the player's winnings, according to a predetermined paytable, in two steps.

Figure 3A:
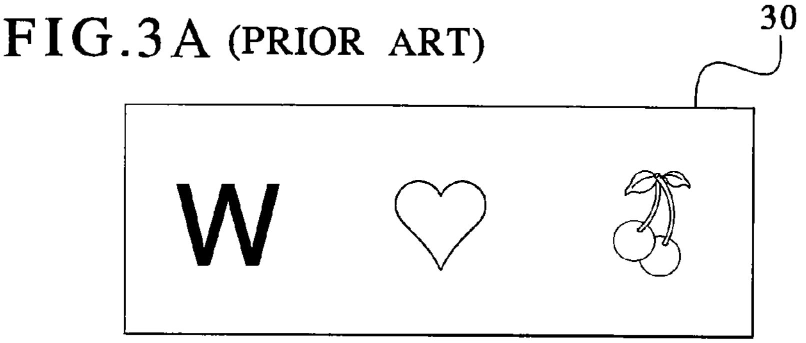
FIG.3A (PRIOR ART)
FIGS. 3A through 3C are schematic views of three screens of a display device illustrating the prior or known effect of a wild symbol.
Figure 3B:
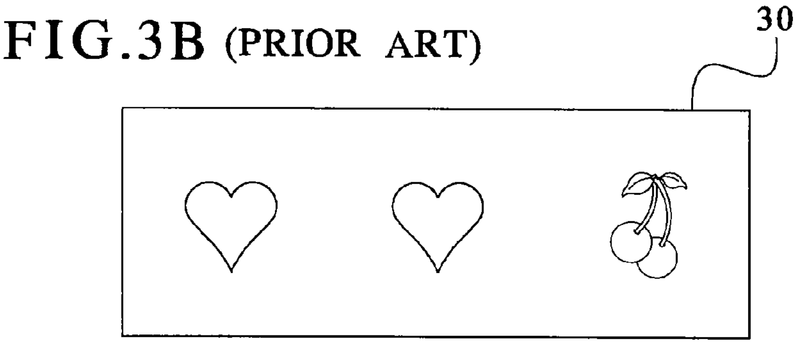
FIG.3B (PRIOR ART)
Figure 3C:
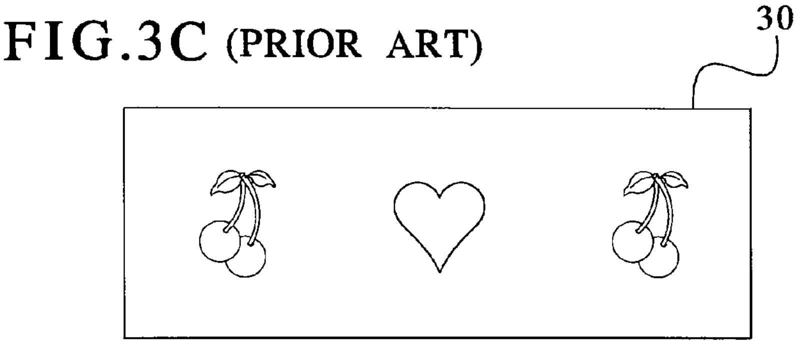
FIG.3C (PRIOR ART)

In a first step, one preferred method of the present invention evaluates or finds all winning symbols and symbol combinations before the wild symbol replaces or substitutes for any other symbols. The wild symbol 110 on reel 34*b* and payline 56*a* of FIG. 5A preferably has the effect described above in FIGS. 3A and 3B. The wild symbol stands in the place of a cherry symbol and/or a heart symbol. Along payline 56*a*, then, the player wins fifty credits for the three cherries appearing on the reels 34*a*, 34*b* and 34*c*. Paylines 56*b* and 56*c* produce no winning combinations.

The first step of the method of the present invention provides fifty overall credits to the player. It should be appreciated that the first step can alternatively not give the wild symbol the effect described in FIGS. 3A and 3B, namely to stand in the place of all non-wild symbols, and still award credits for any award generating non-wild symbol or combinations. It should also be appreciated that the implementor of the present invention can design one or more reels or otherwise design a game wherein the player is guaranteed or predetermined to obtain one or more wild symbols. For instance, in FIGS. 5A and 5B, the implementor can place a wild symbol 110 on every third position of a reel, so that the player is guaranteed to receive one wild symbol 110 on that reel. It should further be appreciated that the present invention contemplates any award including but not limited to credits, multipliers, a number of picks from an award set or any combination thereof.

In a second step, one preferred method of the present invention evaluates or finds all winning symbols and symbol combinations after the wild symbol 110 replaces the other symbols. The wild symbol "W" on reel 34*b* and paylines 56*a*, 56*b* and 56*c* of FIG. 5B have the effect described above in FIGS. 3A and 3B. Along payline 56*a*, as before, the player wins fifty credits for the three cherries appearing on the reels 34*a*, 34*b* and 34*c*. Along payline 56*b*, the player now wins 100 credits for the two hearts and a cherry appearing on the reels 34*a*, 34*b* and 34*c*. Along payline 56*c*, the player now wins ten credits for a heart-heart combination appearing on reels 34*a* and 34*b*.

The second step of the method of the present invention provides 160 overall credits to the player. Both steps provide 210 credits to the player. It should be appreciated that any award produced in the first step is included or counted again in the second step along with any new winning symbol or symbol combinations produced by the expanding wild symbol. In this example the awards produced along payline 56*a* are included or counted again in the second step.

FIGS. 5A and 5B disclose one preferred method of the present invention in a slot machine embodiment, wherein a preferably randomly generated wild symbol 110 replaces every other symbol on a reel associated with or containing the wild symbol 110. In a preferred embodiment of the preferred method of the present invention, the game places one or more wild symbols 110 on the middle three of five reels. The present invention can place wild symbols 110 on any number and combination of reels. The present invention also applies to a plurality of different situations, wherein the wild symbol can replace different associated non-wild symbols as discussed in detail below.

Figure 6A:
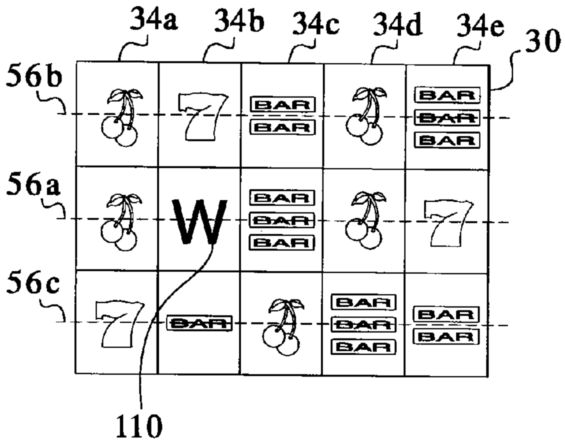
FIGS. 6A and 6B are front elevational views of a display device including the preferred method of the present invention in a slot machine embodiment, wherein a preferably randomly generated wild symbol replaces one or more, but not all, non-wild symbols on a row associated with the wild symbol.
Figure 6B:
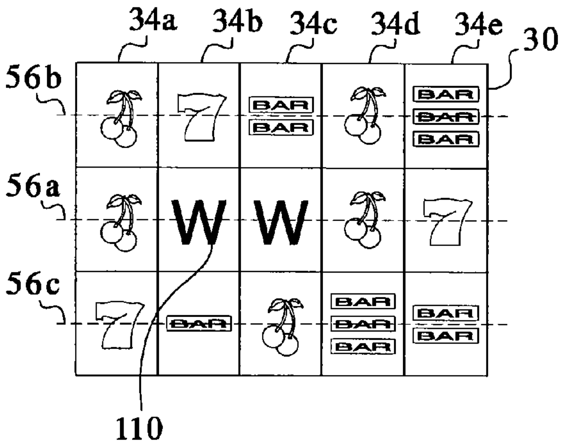

Referring now to FIGS. 6A and 6B, one preferred method of the present invention is illustrated in a slot machine embodiment, wherein a preferably randomly generated wild symbol 110 on a central display device 30 replaces one or more, but not all, non-wild symbols on a row associated with or containing the wild symbol 110. FIGS. 6A and 6B include five reels 34*a* through 34*e* and three paylines 56*a* through 56*c*. FIG. 6B illustrates a wild symbol on reel 34*c* and payline 56*a* replacing a three-bar symbol on the same position in FIG. 6A. The present invention contemplates a symbol replacement to the left or right of the preferably randomly generated wild symbol 110. The symbol replacement is preferably but does not have to be adjacent to the generated wild symbol 110. The embodiment of FIGS. 6A and 6B contemplates any number, less than all, of symbol replacements on an associated row.

Figure 7A:
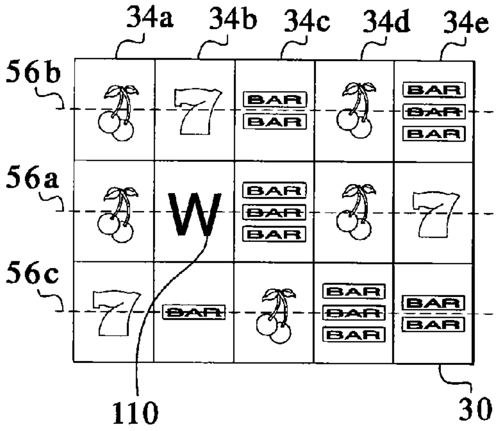
FIGS. 7A and 7B are front elevational views of a display device including the preferred method of the present invention in a slot machine embodiment, wherein a preferably randomly generated wild symbol replaces all the non-wild symbols on a row associated with the wild symbol.
Figure 7B:
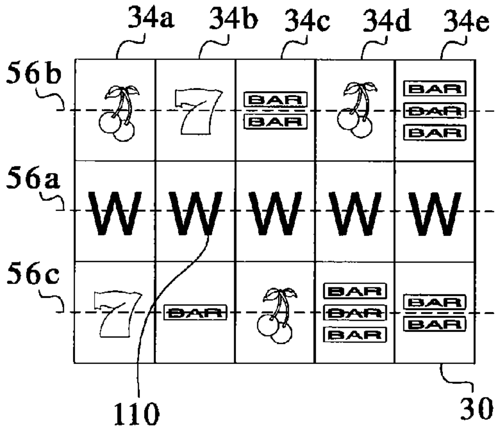

Referring to FIGS. 7A and 7B, one preferred method of the present invention is illustrated in a slot machine embodiment, wherein a preferably randomly generated wild symbol 110 on a central display device 30 replaces all the non-wild symbols on a row associated with or containing the wild symbol 110. FIGS. 7A and 7B include five reels 34*a* through 34*e* and three paylines 56*a* through 56*c*. FIG. 7B illustrates wild symbols on reels 34*a*, 34*c*, 34*d* and 34*e* and payline 56*a* replacing the respective symbols having the same positions in FIG. 7A.

Figure 8A:
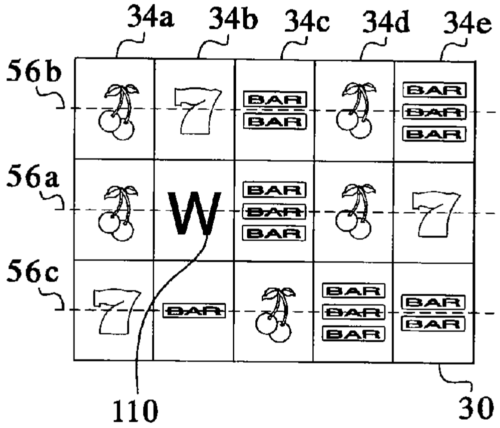
FIGS. 8A and 8B are front elevational views of a display device including the preferred method of the present invention in a slot machine embodiment, wherein a preferably randomly generated wild symbol replaces one or more, but not all, non-wild displayed symbols on a reel associated with the wild symbol.
Figure 8B:
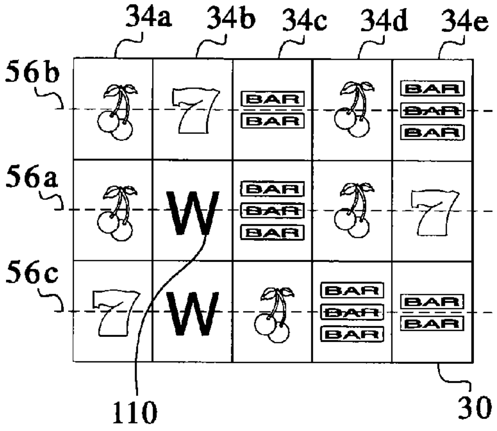

Referring to FIGS. 8A and 8B, one preferred method of the present invention is illustrated in a slot machine embodiment, wherein a preferably randomly generated wild symbol 110 on a central display device 30 replaces one or more, but not all, non-wild displayed symbols on a reel associated with or containing the wild symbol 110. FIGS. 8A and 8B include five reels, 34*a* through 34*e*, and three paylines, 56*a* through 56*c*. FIG. 8B illustrates a wild symbol on reel 34*b* and payline 56*c* replacing a one-bar symbol on the same position in FIG. 8A. The present invention contemplates a symbol replacement on the top or bottom of the preferably randomly generated wild symbol 110. The symbol replacement is preferably, but does not have to be adjacent to the generated wild symbol 110. The embodiment of FIGS. 8A and 8B contemplates any number, less than all, of displayed symbol replacements on an associated reel. It should be appreciated that the earlier embodiment of FIGS. 5A and 5B illustrated and contemplated replacing all non-wild displayed symbols on an associated reel.

Figure 9A:
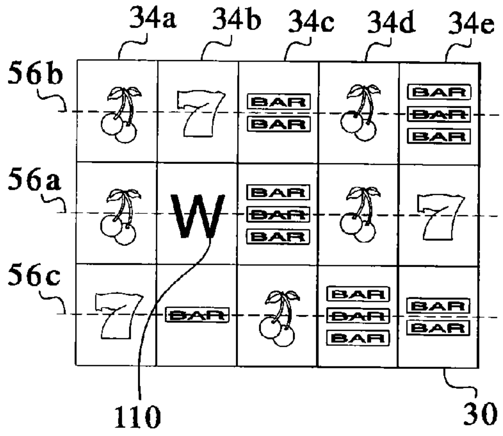
FIGS. 9A and 9B are front elevational views of a display device including the preferred method of the present invention in a slot machine embodiment, wherein a preferably randomly generated wild symbol replaces one or more, but not all, non-wild displayed symbols on a row and reel associated with the wild symbol.
Figure 9B:
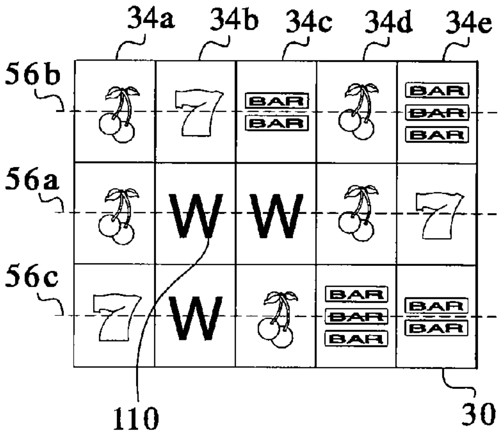

Referring to FIGS. 9A and 9B, one preferred method of the present invention is illustrated in a slot machine embodiment, wherein a preferably randomly generated wild symbol 110 on a central display device 30 replaces one or more, but not all, non-wild displayed symbols on a row and reel associated with or containing the wild symbol 110. FIGS. 9A and 9B include five reels 34*a* through 34*e* and three paylines 56*a* through 56*c*. FIG. 9B illustrates a wild symbol on reel 34*b* and payline 56*c* replacing a one-bar symbol on the same position in FIG. 9A. FIG. 9B also illustrates a wild symbol on reel 34*c* and payline 56*a* replacing a three-bar symbol on the same position in FIG. 8A. The present invention contemplates a symbol replacement on the top, bottom, left or right of the preferably randomly generated wild symbol 110. The symbol replacement is preferably but does not have to be adjacent to the generated wild symbol 110. The embodiment of FIGS. 9A and 9B contemplates any number, less than all, of displayed symbol replacements on an associated row and reel.

Figure 10A:
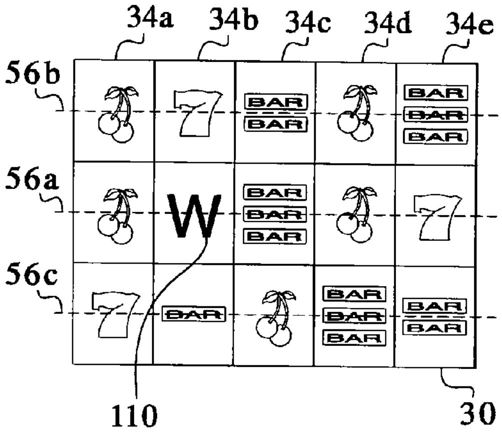
FIGS. 10A and 10B are front elevational views of a display device including the preferred method of the present invention in a slot machine embodiment, wherein a preferably randomly generated wild symbol replaces all the non-wild symbols on a row and a reel associated with the wild symbol.
Figure 10B:
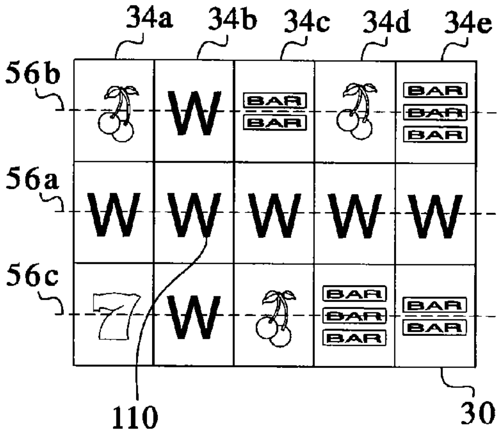

Referring to FIGS. 10A and 10B, the preferred method of the present invention is illustrated in a slot machine embodiment, wherein a preferably randomly generated wild symbol 110 on a central display device 30 replaces all the non-wild symbols on a row and a reel associated with or containing the wild symbol 110. FIGS. 10A and 10B include five reels 34*a* through 34*e* and three paylines 56*a* through 56*c*. FIG. 10B illustrates wild symbols on reels 34*a*, 34*c*, 34*d* and 34*e* and payline 56*a* replacing the respective symbols having the same positions in FIG. 10A. FIG. 10B also illustrates wild symbols on paylines 56*b* and 56*c* and reel 34*b* replacing the respective symbols having the same positions in FIG. 10A.

Referring to the embodiments of FIGS. 7A and 7B and 10A and 10B, the game replaced all non-wild symbols of a payline, namely payline 56*a*, when the game replaced all the non-wild symbols of the row associated with payline 56*a*. It should first be appreciated that the present invention contemplates replacing every non-wild symbol of a row of symbols without replacing every non-wild symbol of a payline at the same time. The present invention also contemplates replacing every non-wild symbol on a payline even if the payline is completely diagonal or has a diagonal component.

Figure 11A:
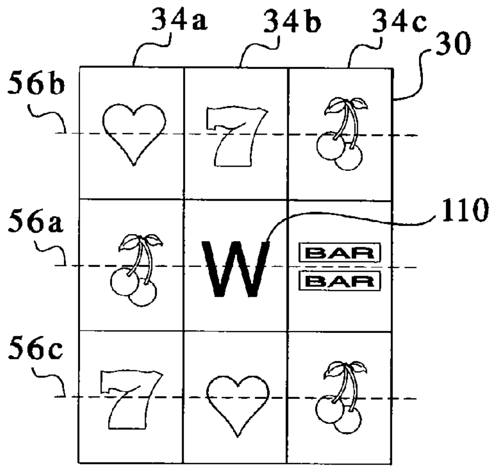
FIGS. 11A and 11B are front elevational views of a display device including the preferred method of the present invention in a slot machine embodiment, wherein a preferably randomly generated wild symbol replaces all displayed non-wild symbols of a particular kind.
Figure 11B:
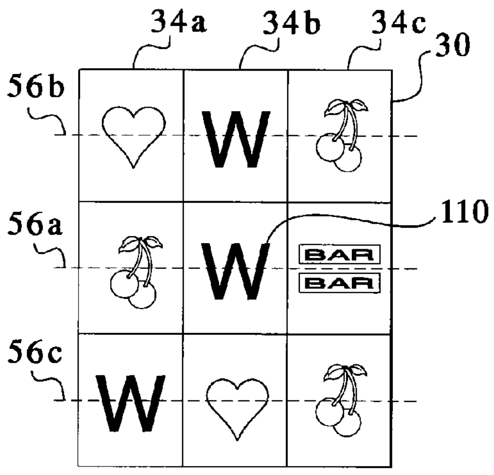

Referring to FIGS. 11A and 11B, the preferred method of the present invention is illustrated in a slot machine embodiment, wherein a preferably randomly generated wild symbol 110 on a central display device 30 replaces all displayed non-wild symbols of a particular kind. In this example, the generated wild symbol 110 replaces all generated "7" symbols. FIGS. 11A and 11B include three reels 34*a* through 34*c* and three paylines 56*a* through 56*c*. FIG. 11B illustrates wild symbols on the position of reel 34*a* and payline 56*c* and on the position of reel 34*b* and payline 56*b* replacing the "7" symbols having the same positions in FIG. 11A. It should be appreciated that the game can replace more than one symbol, such as the seven and the heart in FIG. 11A.

FIGS. 11A and 11B illustrate that the present invention can replace non-wild symbols occurring on reels and in rows not associated or not including the generated wild symbol 110. It should be appreciated that the present invention contemplates the game replacing or substituting one or more symbols of a reel, row, diagonal line of symbols or any combination thereof unassociated with or not containing the generated wild symbol 110.

Preferred Method—Poker Game Embodiment

Figure 12:
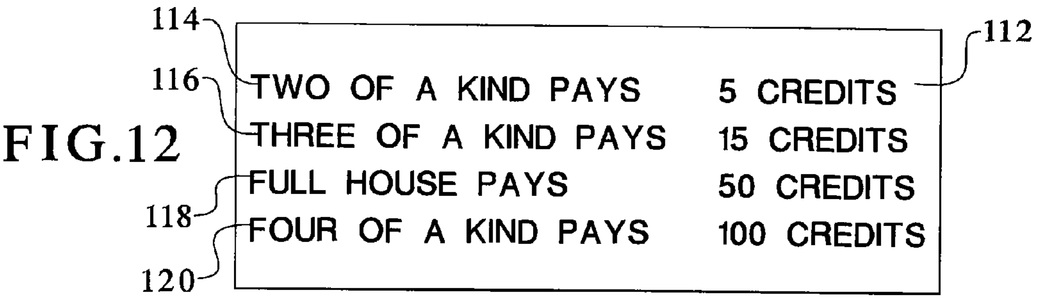
FIG. 12 is a front elevational view of a display device having a sample paytable, which includes a plurality of winning playing card combinations for a poker game embodiment of the present invention.

Referring now to FIG. 12, a well known paytable 112 having a plurality of winning playing card symbol combinations that will aid in the description of the card game embodiment is illustrated. The card game embodiment is illustrated as a well known five card draw poker game, wherein the player receives points or credits for achieving predetermined combinations of playing card values or symbols.

As before, the paytable 112 can appear on the upper display device 32. Paytable 112 includes: a winning combination 114 of two of a kind (of any playing card values or symbols) that yields five credits to the player; a winning combination 116 of three of a kind that yields fifteen credits to the player; a winning combination 118 of a full house (two of a kind plus three of a kind) that yields fifty credits to the player; and a winning combination 120 of four of a kind that yields 100 credits to the player. Although not shown, paytable 112 can also provide an award for obtaining any single playing card, such as an ace.

Figure 13:
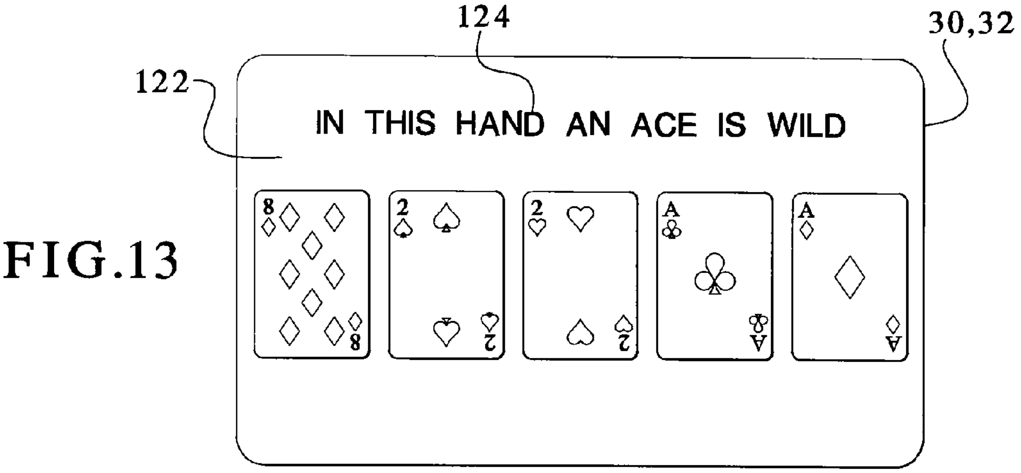
FIG. 13 is a front elevational view of a display device including the preferred method of the present invention in a poker game or card game embodiment.

Referring now to FIG. 13, the preferred method of the present invention is disclosed in a poker game embodiment. FIG. 13 can include the central display device 30 or the upper display device 32. FIG. 13 illustrates a plurality of randomly generated playing cards or a hand 122, which can form a winning combination according to the paytable 112 of FIG. 12. In FIG. 13, the game randomly generated the hand 122 that includes the eight of diamonds, the two of spades, the two of hearts, the ace of clubs and the ace of diamonds.

FIG. 13 also includes a preferably randomly generated wildcard, which is one of the playing cards. The game can assign one or more of the cards to be a wildcard at any point of the game. In this example the game has preferably randomly determined but alternatively predetermined that all aces are wildcards, as indicated by the message 124. The game can give any suitable desirable effect to a wildcard, however, the game preferably gives the known poker effect to a wildcard. That is, the game enables the wildcard to adopt or equate to any desired playing card value or symbol. The game can automatically and optimally determine which value or symbol with which to equate a wildcard. The preferred method of the present invention evaluates the player's winnings, according to the paytable 112, in two steps.

In a first step, the preferred method of the present invention evaluates or finds all winning playing card and playing card combinations before the game activates or equates the wildcard to a particular playing card. According to the paychart 112 of FIG. 12 and the hand 122, the player wins five credits for a two of a kind winning combination 114 for the two twos and five credits for a two of a kind winning combination 114 for the two aces. The first step of the method of the present invention provides ten credits to the player.

In a second step, the preferred method of the present invention equates the wildcard to one of the other non-wild cards of the hand 122. Since the wildcard preferably equates to only one other card, the player or game must in the second step optimally decide which non-wildcard of the hand 122 with which to equate. Since aces are wild in the hand 122, the game or player can equate the two aces to the eight of diamonds and create a full house winning combination 118 including three eight's over two two's. Alternatively, the game or player can equate the two aces to the two's (of spades and of hearts) and create a four of a kind winning combination 120. Since, according to the paytable 112 four of a kind 120 pays better than a full house 118, the game or player preferably equates the two aces to the two's.

In the second step, the player obtains 100 credits for the four of a kind winning combination 120. Overall, the player wins 110 credits in the poker game employing the preferred method of the present invention.

FIG. 13 discloses the preferred wildcard effect for the method of the present invention in a poker machine embodiment, wherein the wildcard equates to one of the other non-wild cards of the hand 122. The present invention can alternatively equate the wildcard to each non-wildcard of the hand 122. In this embodiment the game provides a plurality of second step awards: (i) 100 credits for four two's, and (ii) 50 credits for the full house eight's over two's.

The draw poker game preferably contain one or more card exchanges, wherein the game enables the player to keep certain cards and discard others. That is, the player can for example keep a pair of kings and a wildcard and discard a four and a two. The game will issue two new replacement cards. The game can then enable another card exchange. The evaluation method applies to a draw poker game having a card exchange the same as described above. After the game enables the player to exchange cards, the game employs the evaluation sequence by: (i) providing an award for winning card combinations present before activating or equating the wildcard; and (ii) providing an award for winning card combinations present after activating or equating the wildcard.

Most poker games do not, and likewise the poker game of the present invention preferably does not provide a separate award for a full house and its constituent three of a kind and two of a kind. Likewise, poker games generally do not pay for one, four of a kind and two, two of a kind combinations. That is, in the alternative embodiment, the game equates the wildcard to each non-wildcard but preferably does so for one, the most profitable, winning combination.

Alternative Method

Figure 14A:
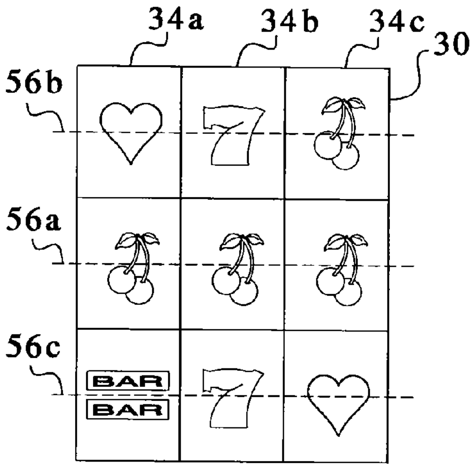
FIGS. 14A and 14B are front elevational views of a display device including the alternative method of the present invention in a slot machine embodiment, wherein the game replaces one or more symbols with one or more different symbols.
Figure 14B:
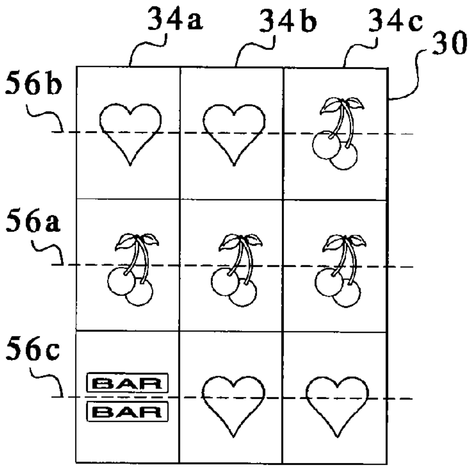

Referring now to FIGS. 14A and 14B, the present invention contemplates an alternative embodiment, illustrated here in connection with a slot machine embodiment, wherein the game replaces one or more symbols with one or more different symbols. That is, the replacement is not a wild symbol. The alternative method still applies a similar two step evaluation, wherein the game adds all awards from winning symbols or symbol combinations before the replacement to all awards from winning symbols or symbol combinations after the replacement.

The paytable 100 of FIG. 4 applies to and is used to describe the alternative slot machine method of the present invention including a central display device 30, three reels 34*a*, 34*b* and 34*c* and three paylines 56*a*, 56*b* and 56*c*. In this example of the present invention the heart symbol replaces a "7" symbol. In the first step of the evaluation, the player wins 50 credits for obtaining three cherry symbols along payline 56*a*. The game then replaces each "7" with a heart symbol, which results in the screen of FIG. 14B.

In the second step evaluation, the player again wins 50 credits for obtaining three cherry symbols along payline 56*a*, 100 credits for the heart-heart-cherry combination on reels 34*a*, 34*b* and 34*c* of payline 56*b* and 10 more credits for the heart-heart combination on reels 34*b* and 34*c* and payline 56*c*. The total for the second step evaluation is 160 credits and the total for the alternative slot machine embodiment round is 220.

Figure 15A:
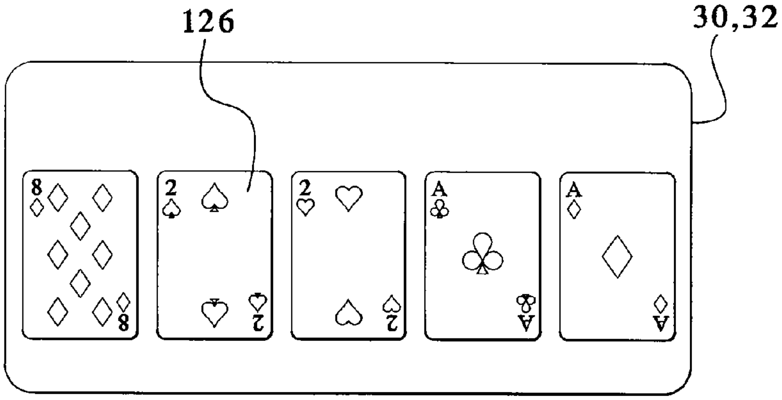
FIGS. 15A and 15B are front elevational views of a display device including the alternative method of the present invention in a poker or card game embodiment, wherein the game replaces one or more symbols with one or more different symbols.
Figure 15B:
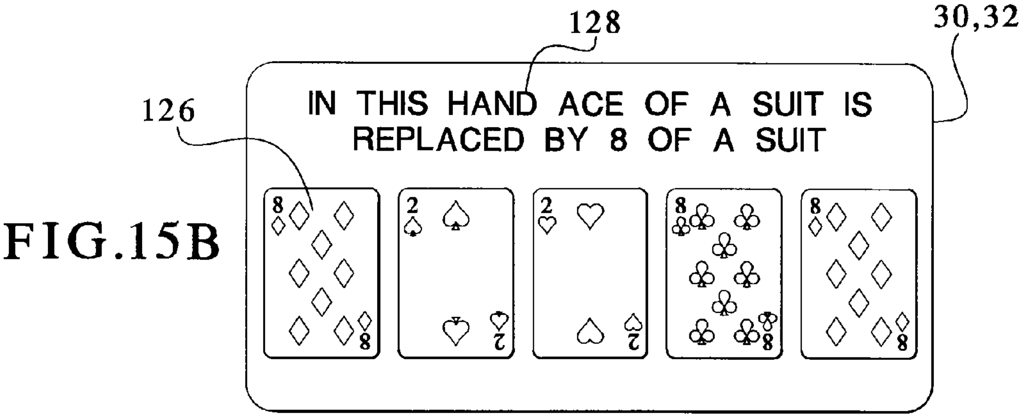

Referring now to FIGS. 15A and 15B, the present invention contemplates the alternative embodiment in connection with the poker game, wherein the game replaces one or more playing cards with one or more different playing cards. That is, the replacement is not a wildcard replacement wherein one card of a hand adopts or equates to another card of a hand. In FIGS. 15A and 15B, which are evaluated in conjunction with the paytable 112 of FIG. 12, one of the displays 30 or 32 includes a hand 126 and a message 128 indicating that an ace of a suit is replaced by an eight of the same suit.

FIG. 15A includes the initial hand 126 including an eight of diamonds, a two of spades, a two of hearts, an ace of clubs and an ace of diamonds. In the first evaluation of the alternative embodiment, the player receives five credits for the two of a kind two's and five credits for the two of a kind ace's, according to FIG. 12, for a total of 10 credits. In the second evaluation, the player receives 50 credits for a full house eight's over two's, according to FIG. 12. The game contemplates enabling two of the same card to exist in one hand at the same time, e.g., two eight of diamonds as illustrated in FIG. 15B. The player again preferably does not win constituent combinations in the poker embodiment. The total win for the alternative method poker embodiment is 60 credits.

It should be appreciated that in both the alternative slot and poker embodiments, more than one symbol can replace more than one different symbol as desired by the implementor. In the alternative slot embodiment for example, a heart can replace a "7" and a cherry can replace a bar. In the alternative poker embodiment, the ace of a suit can be replaced by the eight of the same suit and the king of a suit can be replaced by the two of the same suit.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of at least one processor, said gaming device comprising:

a game operable upon a wager by a player;

a plurality of symbols in the game, said symbols including a plurality of different symbols;

a plurality of different paylines in the game, said paylines including a plurality of paylines each having at least one diagonal component;

a plurality of different qualifying conditions in the game, each qualifying condition including a predetermined combination of said symbols generated along one of the paylines;

a display device controlled by the at least one processor, said display device operable to display said symbols and said paylines; and a memory device in communication with the at least one processor, said memory device storing instructions which, for a single play of the game, cause the at least one processor to:

(a) cause the display device to display a plurality of said symbols along each of said paylines, (b) evaluate each payline for any of the qualifying conditions, (c) provide an award for each qualifying condition displayed along at least one of the paylines, wherein said award is based on a predetermined paytable (d) for each payline having one of the qualifying conditions, cause the display device to display a replacement of each of the symbols in said qualifying condition with one of the plurality of symbols, and (e) repeat (b) to (c) at least once.

2. The gaming device of claim 1, wherein at least one of the qualifying conditions includes two of the same symbols.

3. The gaming device of claim 1, wherein at least two of the symbols replacing the symbols of the qualifying condition are the same symbol.

4. The gaming device of claim 1, wherein at least one of the symbols replacing at least one of the symbols of the qualifying condition is a wild symbol, and wherein said wild symbol substitutes for one of the plurality symbols.

5. The gaming device of claim 4, wherein the wild symbol substitutes for at least one displayed symbol.

6. The gaming device of claim 1, wherein the instructions cause the processor to repeat (d) at least once.

7. The gaming device of claim 1, wherein at least one of the symbols replacing at least one of the symbols of the qualifying condition is one of symbols displayed along another one of the paylines.

8. A gaming device operable under control of at least one processor, said gaming device comprising:

a game operable upon a wager by a player;

a plurality of symbols in the game, said symbols including a plurality of different symbols;

a plurality of different paylines in the game, at least one of said plurality of paylines having at least one diagonal component;

at least one qualifying condition, said qualifying condition including at least one predetermined symbol or at least one predetermined combination of symbols;

a display device controlled by the at least one processor, said display device operable to display said symbols and said paylines; and a memory device in communication with the at least one processor, said memory device storing instructions which, for a single play of the game, cause the at least one processor to:

(a) cause the display device to display a plurality of the symbols along each of the paylines, (b) evaluate each payline for any qualifying conditions and provide an award to the player for each qualifying condition on each payline, wherein each award is based on a predetermined paytable, (c) for each payline having one of the qualifying conditions, cause the display device to display a replacement on said payline of each of the symbols in said qualifying condition with a replacement symbol from said plurality of symbols, and (d) repeat (b) at least once.

9. The gaming device of claim 8, wherein a plurality of the paylines each include at least one diagonal component.

10. The gaming device of claim 8, which includes a plurality of qualifying conditions.

11. The gaming device of claim 10, wherein the qualifying conditions each include a different predetermined combination of symbols.

12. The gaming device of claim 8, wherein the replacement symbols include a wild symbol, and wherein said wild symbol substitutes for one of the plurality of symbols.

13. The gaming device of claim 12, wherein the wild symbol substitutes for at least one displayed symbol.

14. The gaming device of claim 8, wherein at least two of the replacement symbols are the same symbol.

15. The gaming device of claim 8, wherein the instructions cause the at least one processor to repeat (c) at least once.

16. The gaming device of claim 8, wherein at least one of the symbols replacing at least one of the symbols of the qualifying condition is one of symbols displayed along another one of the paylines.

17. A gaming device operable under control of at least one processor, said gaming device comprising:

a game operable upon a wager by a player;

a plurality of symbols in said game, said symbols including a plurality of different symbols;

a plurality of different predetermined winning combinations of symbols;

a plurality of different paylines in the game, a plurality of said paylines each having at least one diagonal component;

a display device controlled by the at least one processor, said display device operable to display said symbols and said paylines; and a memory device in communication with the at least one processor, said memory device storing instructions which, for a single play of the game, cause the at least one processor to:

(a) cause the display device to display a plurality of said symbols along each of said paylines, (b) perform an initial evaluation of each payline and provide an award for each occurrence of one of the predetermined winning combination of symbols, wherein each award is based on a predetermined paytable, (c) cause the display device to display a replacement of at least three of the symbols generated displayed along at least one of the paylines having at least one diagonal component with a plurality of the plurality of symbols, and (d) perform a further evaluation of each payline and provide an award for each occurrence of one of the predetermined winning combination of symbols, wherein each award is based on a predetermined paytable.

18. The gaming device of claim 17, wherein the at least three symbols form one of the predetermined winning combinations of symbols.

19. The gaming device of claim 17, wherein at least two of the other symbols that replace the at least three symbols are the same symbols.

20. The gaming device of claim 17, wherein the symbols that replace the at least three symbols include at least one wild symbol, wherein said wild symbol substitutes for one of the other symbols.

21. The gaming device of claim 17, wherein the instructions cause the processor to repeat (c) and (d) until any one of the winning combination of symbols does not occur.

22. The gaming device of claim 17, wherein at least one of the symbols that replaces at least one of the at least three symbols is one of symbols displayed along another one of the paylines.

23. A method of operating a single play of a game operable upon a wager, said method comprising:
(a) providing a plurality of symbols including a plurality of different symbols;
(b) displaying a plurality of said symbols along each of a plurality of different paylines, wherein each of a plurality of said paylines includes at least one diagonal component;
(c) evaluating each payline for at least one of a plurality of different qualifying conditions, each of said qualifying conditions including a predetermined combination of symbols;
(d) providing an award for each qualifying condition displayed along one of the paylines, said provided award based on a predetermined paytable;
(e) for each payline having one of the qualifying conditions, replacing each of the symbols in said qualifying condition with one of the other symbols from said plurality of symbols; and
(f) repeating (c) to (d) at least once.

24. The method of claim 23, which includes, for at least payline having one of the qualifying conditions, replacing at least one of the symbols not in said qualifying condition with another symbol from said plurality of symbols.

25. The method of claim 23, which includes, for at least payline having one of the qualifying conditions, replacing each of the symbols of the qualifying condition with the same symbol.

26. The method of claim 23, which includes, for at least payline having one of the qualifying conditions, replacing each of the same symbols of the qualifying condition with the same symbol.

27. The method of claim 23, which includes repeating (c) through (e) until any one of the qualifying conditions does not occur on one of the paylines.

28. The method of claim 23, which is operating through a data network.

29. The method of claim 28, wherein the data network is an internet.

30. A method of operating a single play of a game operable upon a wager, said method comprising:
(a) displaying a plurality of symbols including a plurality of different symbols along each of a plurality of different paylines, wherein at least one of said paylines includes at least one diagonal component;
(b) evaluating each payline for at least one qualifying condition, said qualifying condition including at least one predetermined symbol or symbol combination, and providing an award for each qualifying condition displayed along one of the paylines, wherein each award is based on a predetermined paytable;
(c) for each payline having one of the qualifying conditions, replacing each of the symbols on said payline in said qualifying condition with replacement symbols from said plurality of symbols; and
(d) repeating (b) at least once.

31. The method of claim 30, which includes a plurality of different qualifying conditions.

32. The method of claim 31, wherein each the qualifying conditions includes a different predetermined combination of symbols.

33. The method of claim 30, which is operated through a data network.

34. The method of claim 33, wherein the data network is the internet.

35. A method of operating a single play of a game operable upon a wager, said method comprising:
(a) providing a plurality of symbols including a plurality of different symbols;
(b) displaying a plurality of said symbols along each of a plurality of different paylines, wherein a plurality of said paylines each include at least one diagonal component;
(c) evaluating each payline and providing an award for each occurrence of one of a plurality of different predetermined winning combination of symbols, wherein each award is based on a predetermined paytable;
(d) replacing at least three of the symbols generated along at least one of the paylines having at least one diagonal component with other symbols from said plurality of symbols; and
(e) evaluating each payline and providing an award for each occurrence of one of the plurality of predetermined winning combinations of symbols, wherein each award is based on the predetermined paytable.

36. The method of claim 35, wherein at least two of the at least three displayed symbols replaced by the other symbols are the same symbol.

37. The method of claim 35, which includes replacing each of the at least three displayed symbols with the same symbol.

38. The method of claim 35, which includes repeating (c) and (d) until one of the predetermined winning combinations of symbols does not occur.

39. The method of claim 35, which is operated through a data network.

40. The method of claim 39, wherein the data network is an internet.

* * * * *

UNITED STATES PATENT AND TRADEMARK OFFICE

CERTIFICATE OF CORRECTION

PATENT NO. : 7,226,359 B2
APPLICATION NO. : 11/277608
DATED : June 5, 2007
INVENTOR(S) : William J. Bussick et al.

It is certified that error appears in the above-identified patent and that said Letters Patent is hereby corrected as shown below:

IN THE CLAIMS:

In Claim 32, column 16, line 10, change “wherein each the” to --wherein each of the--.

In Claim 4, column 13, line 25, change “one of the plurality symbols” to --one of the plurality of symbols--.

In Claim 24, column 15, line 25, change “for at least payline” to --for at least one payline--.

In Claim 25, column 15, line 29, change “for at least payline” to --for at least one payline--.

In Claim 26, column 15, line 33, change “for at least payline” to --for at least one payline--.

Signed and Sealed this

Eleventh Day of September, 2007

JON W. DUDAS

*Director of the United States Patent and Trademark Office*